Oct. 27, 1925.

W. SOUDER 1,558,513

DEVICE FOR RULING GRADUATED SCALES

Filed Aug. 29, 1923    2 Sheets-Sheet 1

INVENTOR

Wilmer Souder

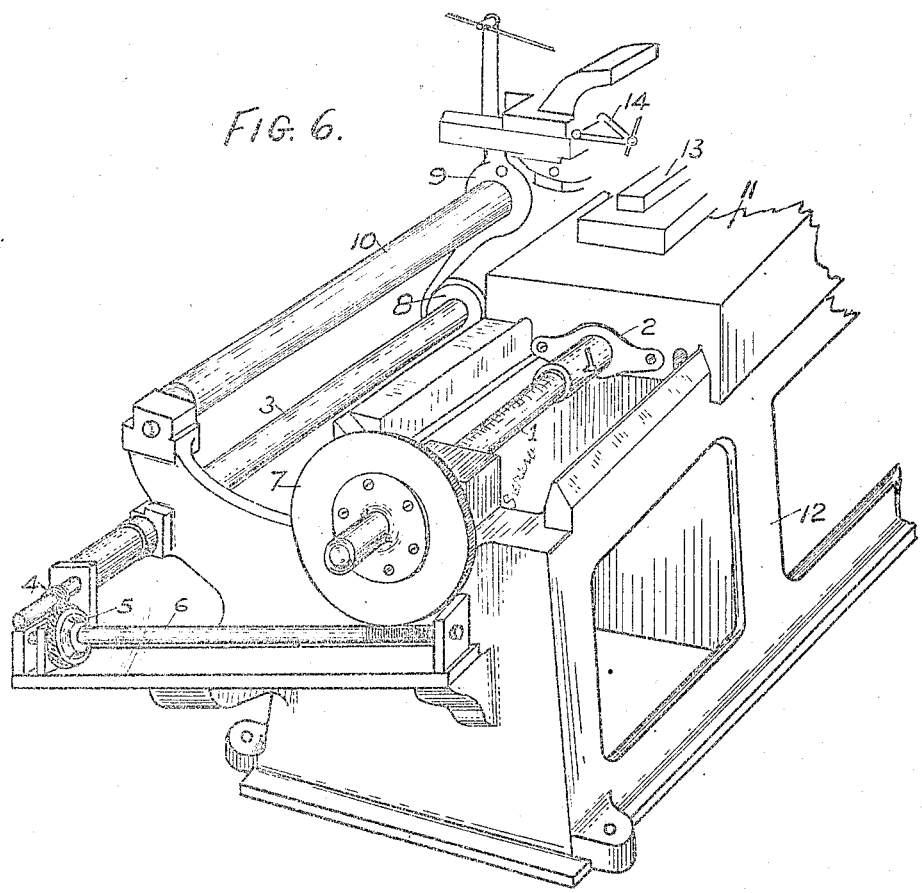

Patented Oct. 27, 1925.

UNITED STATES PATENT OFFICE.

WILMER SOUDER, OF SALEM, INDIANA.

DEVICE FOR RULING GRADUATED SCALES.

Application filed August 29, 1923. Serial No. 660,059.

(GRANTED UNDER THE ACT OF MARCH 3, 1883; 22 STAT. L. 625.)

*To all whom it may concern:*

Be it known that I, WILMER SOUDER, a citizen of the United States, and legal resident of Salem, county of Washington, State of Indiana, have invented certain new and useful Improvements in Devices for Ruling Graduated Scales, of which the following is a specification.

The invention described herein may be used by the Government or any of its officers or employees, or by any other person in the United States in the prosecution of work for the Government without payment of any royalty thereon.

This invention is a graduating or ruling device designed more particularly for use in dividing engines.

The device is especially adapted for ruling machines used in making optical gratings, although it is to be understood that its uses are not limited to such work, in devices designed to engrave surfaces or work-subjects to determine by the spectroscopic method the elements composing a particular substance under investigation, assurance that the lines will be accurately spaced relative to each other is imperative. Such ruling or graduating machines as have been heretofore known to me have provided means whereby the surface under treatment—for example, composite or alloyed metals—is slowly propelled by an intermittent movement in one direction while an engraving tool or ruler is reciprocated across the metal surface being treated. In devices known to me, the usual procedure in ruling gratings is to advance the carriage, supporting the grating a definite amount, say one micron, then stop the carriage and rule the line. During this interval the carriage is supposed to remain stationary, but such is not always the case. Often there is a tendency to creep or continue this movement during the interval of supposed rest. The amount of friction and elastic properties of the machine appear to be responsible for this effect. This irregular creeping, present at times and absent at other times, causes errors in the rulings.

A further difficulty met in these types of machines is the wear in the ratchet and tooth drive mechanism. The ratchet is usually allowed to move between two stops, the advance of the carriage being roughly proportional to the distance or number of teeth between stops. The impact or driving force of the ratchet against the teeth has an appreciable wearing effect and, when the number of teeth in the stop integral is in excess of one and also is commensurable with the total number of teeth, there is introduced a definite periodic error. Such irregularities and periodic errors are present in all work turned out by the usual type of machine. The intermittent movement of the work-subject under treatment in machines of this type results in uneven graduations or engravings and consequently produces imperfect gratings. Such gratings produce faulty optical results when used to determine the element or elements composing a substance.

It is not often that a line standard ruled to inches, centimeters or other intervals has a continued accuracy better than 1/25000 inch or 1 micron. Metrological laboratories often certify values of intervals to an exactness of 1/10 of the above, i. e., 1/250,000 inch or 1/10 micron. Now if the standard of the laboratory has been generated by a machine producing the usual errors of 1/10,000 to 1/25,000 inch or 1/4 to 1 micron, it is evident that no comparisons are complete until the laboratory standard has been calibrated, and the errors computed and applied for each interval used. This calibration of intervals for a meter standard divided to millimeters may well require the continuous labor of two metrologists for a period of one year. By constructing a machine which will eliminate the occurrence of these irregular errors, it is possible to reduce the expenses and time necessary for precision length comparison.

The irregularities of line spacings for diffraction gratings are likewise serious. The value of a grating consists in its property of accurately diffracting the different components of a beam of light by an amount which is an exact function of the wave length. The vapor spectra or light color emission of the various elements have definite values or arrangements. These colors or lines, as they are sometimes called, furnish a most positive means for identifying elements, e. g. analyses of the vapors of the sun are made by grating spectra. Traces of elements, too small for chemical analysis, are often identified by spectra.

However, there is always present, with such gratings as are now available, what are commonly known, by spectroscopists, as ghosts. These are extra or superfluous color lines, quite like the real lines of an element. The position, number and intensity of ghost lines are due to the errors of spacing of the rulings on the grating. With uniform spacing of grating lines these effects will disappear and thus eliminate any confusion or errors now met in attempts to interpret completely grating spectra. One purpose of this invention, therefore, is to overcome the deficiencies in machines of the character heretofore used. Accordingly, an aim of this invention is to provide means whereby the work-subject under treatment may be fed at a continuous rate of travel in one direction, while the engraving tool or ruling device is accurately drawn across the surface of the work-subject to thereby produce an optical grating of uniform graduations, and which will give accurate optical results when a substance is subjected to spectroscopic tests wherein such gratings are used.

A further purpose of the invention is to provide an improved mechanism for controlling the movement of the ruling device or cutter tool to lift the tool from the work-subject and to lower it into engagement with the work-subject.

Other objects and advantages will become apparent from the detailed description of one embodiment of the invention. Generally speaking, the invention includes means whereby a constant or continuous rate of travel of the carriage is effected and the occasion for irregular creepings in the intermediate or ratchet feed type of devices is eliminated. By omitting the oscillating ratchet or click the stop or start impacts are avoided and a proper distance between the ruled or engraved lines may be secured by the selection of change or ratio gears between the carriage-drive and the ruling-drive. Moreover, the tendency toward diagonal or sloping lines of the work-subject is eliminated by setting the dividing head or ruling mechanism at the proper advance angle so that the lines are drawn or cut at the correct angle to the direction of motion of the carriage. It is obvious that continuous lateral motion of the carriage may be supplanted by a corresponding motion of the ruling mechanism. Likewise there may be a continuous motion of both.

A practical embodiment of the invention is illustrated in the accompanying drawing forming a part hereof, but it is to be understood that the structure therein shown does not define the limits of the invention, the scope of which is expressed in the appended claims.

Figure 1 is a plan view of the machine.
Figure 2 is a front elevation.
Figure 3 is an end view.

Figure 6 is a perspective view of a portion of the device illustrating the drive mechanism.

Figure 1:
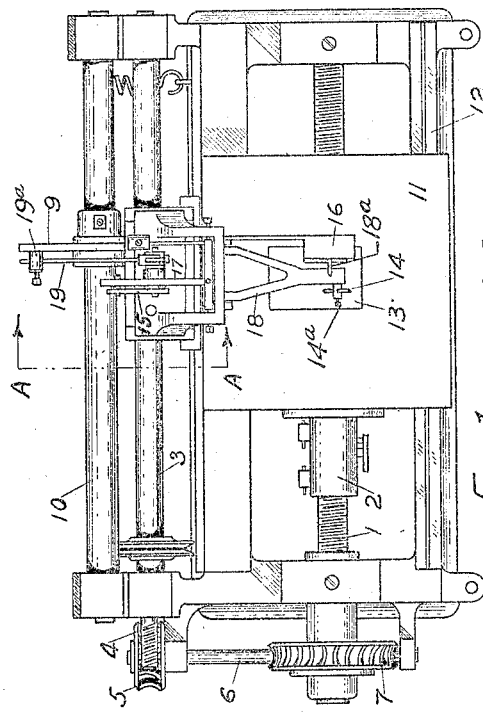
Figure 2:
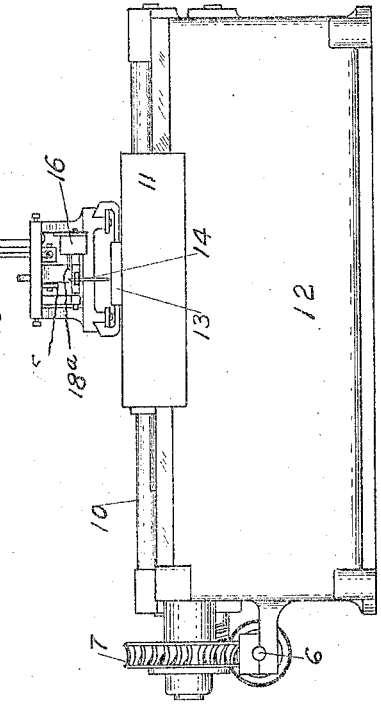

In the embodiment illustrated in the accompanying drawings, the invention is adapted to an ordinary type of dividing engine wherein the elements to be particularly referred to herein are mounted on a base 12. Suitably mounted on the base is a main drive shaft 3 which may be driven by any suitable means (not shown), such for example as a belt drive from a motor. This drive shaft 3 is shown provided with a worm 4 which engages a worm gear 5 carried by the transversely positioned shaft 6. A worm $6^a$ is meshed with a work gear 7 carried by the driving screw 1. Through the reduced gearing the rotation of the shaft 3 is transmitted to rotate the screw 1 at a very slow rate of speed, but will keep the speed constant.

Slidably mounted on the base 12 is a carriage 11, and a split hinged nut 2 engages the screw 1 to move the carriage 11 longitudinally of the base. The work-subject 13, which may be a piece of metal or other substance, is suitably secured to the carriage 11 in the path of the stylus or cutter tool 14.

Figure 3:
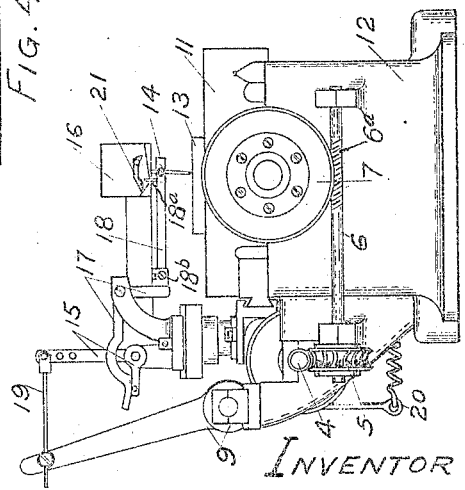

One of the features of the invention is the means to reciprocate the stylus or ruling device 14 across the face of the work-subject 13. A means for accomplishing this result is shown more particularly in Figures 1, 3, 4 and 5 of the drawings. Mounted upon the main drive shaft 3 is a cam 8 which is designed to contact with an arm $8^a$ having a roller contact element $8^b$, which roller rides upon the face of the cam 8 and actuates the oscillating lever 9. In order to maintain the roller contact $8^b$ upon the face of the cam 8 there is provided a retracting means at 20 shown in the form of a rod coupled to a spring which connects the rod to the base 12 of the machine. The rotation of the cam 8 serves to rock the lever 9 and its shaft 10 to which it is connected. Positioned between the lever 9 and the movable carriage 11 is the stylus-operating mechanism. This mechanism is shown in the drawings as comprising a bell crank lever represented by two sections 15 which lever bears against and operates another bell crank lever 17. A rod 19 is pivotally connected to one arm of the lever 15 and is adjustably connected by means of the transmitting rod 19 to the oscillating lever 9. The bell crank lever 17 is fulcrumed upon an arcuate bail, and one arm of the lever 17 supports and actuates a stylus holder 18 which is shown in Figure 1 as comprising a bifurcated element pivotally mounted at 18b to the bell crank lever 17. The free end of the bifurcated element 18 is provided with a small protruding arm 18a which is designed to ride in the trap mechanism indicated at 16 in Figures 1, 3 and 5 of the drawings. Extending in the opposite direction from the free end of this bifurcated holder 18 is a clamping device having a tightening screw 14a which adjustably secures the cutter tool or stylus 14 firmly in position upon the bifurcated stylus holder 18.

The protruding arm 18a transcribes a substantially elliptical path on the inner face of the block 16 holding the trap mechanism.

Figures 4, 5:
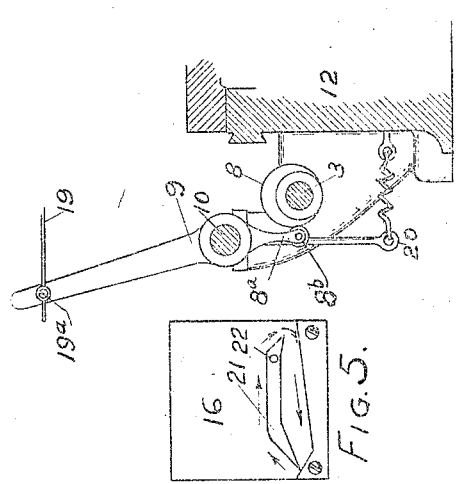
Figure 4 is a section on the line A—A of Figure 1, showing the cam or eccentric which operates the cutting stylus or ruling mechanism.
Figure 5 is an enlarged detail view of the mechanism which controls the lift of the stylus.

By reference to Figure 5 of the drawings the block 16 is shown provided with an escapement latch 21 which may be pivoted at 22 to cause the protruding arm 18a of the stylus holder to pass below the latch 21 when reciprocating in one direction and to pass above the latch 21 when reciprocating in the opposite direction, so that the path of the protruding arm 18a will describe an elliptical figure in a clockwise direction as indicated by the arrows in Figure 5 of the drawings.

In operation, the shaft 3 is driven by any suitable means at a predetermined rate of speed, and by the reduced geared mechanism indicated at 4, 5, 6, 6a and 7, the screw 1 is turned at a very slow rate of speed, advancing by means of the nut 2, the carriage 11. As previously stated, the work-subject 13 is secured to the carriage 11 in the path of the reciprocating stylus 14. The rotation of the shaft 3 will reciprocate the stylus by means of the cam 8, rocking shaft 10 and its lever 9 in such a manner that the bifurcated stylus holder 18 will be moved in a defined reciprocating path across the work-subject 13. It is desired that the stylus shall cut or rule a line only on one direction of travel and shall be lifted from the work-subject on the return movement. Accordingly, the protruding arm 18a, in the embodiment of the invention illustrated, passes beneath the escapement latch 21 on the cutting or ruling stroke, thereby drawing or engraving the line from the forward end of the subject 13 toward the rear end of it, and when the lever 9 is moved in the opposite direction, thereby returning the bifurcated stylus holder to its original drawing position, the protruding arm 18a will ride upon the upper face of the escapement latch 21 in the direction indicated by the arrows in Figure 5 until it reaches the point of the escapement latch beyond the pivot 22, whereupon the stylus will be again brought into contact with the face of the work-subject to rule or engrave the next line. During the period of movement of the protruding arm from the rear end of the escapement latch to the forward end beyond the pivot 22, the continuous movement of the screw 1 operating upon its nut 2 will have moved the carriage 11 sufficiently to place the stylus in a position to draw or cut a new line in juxtaposition to the line last cut or engraved. The movement of the mechanism being continuous as distinguished from a step-by-step or intermediate movement used in the ratchet-operating machines, will cause all of the lines so drawn or cut to be uniform in their spaced relation.

Line spacings of different values may be secured by replacing the gears 4, 5, 6, 6a and 7 with another set of gears having the proper ratio.

Having described my invention what I claim is:

1. In a ruling machine comprising a traveling carriage and ruling mechanism including a stylus, means to cause the carriage to travel continuously in one direction associated with means to cause the stylus to be reciprocated transversely to the movement of the carriage.

2. In a ruling machine comprising a traveling carriage and ruling mechanism including a stylus, means to cause the carriage to travel continuously in one direction associated with means to cause the stylus to be reciprocated transversely to the movement of the carriage, and a controlling means to permit the stylus to assume a work position on one of its transverse reciprocating movements and to lift the stylus from its work position on its reverse reciprocating movement.

3. In a machine of the class described comprising carriage-propelling mechanism for a work-subject, a stylus, and stylus-carrying mechanism, means to continuously move the carriage in one direction and at the same time to continuously actuate the stylus mechanism to cause said stylus to traverse, a determined path transversely of the movement of the carriage, and a controlling means for the stylus to permit the contact of the stylus with the work-subject during a part of the reciprocating movement.

4. A machine of the class described comprising a carriage for a work-subject, means to move the carriage continuously in one direction, a ruling implement, means to continuously reciprocate the implement across the carriage, and a controlling means including an escapement latch to limit the working action of the ruling implement during a part of its reciprocating movements.

5. A machine of the class described comprising a carriage for a work-subject, means to move the carriage continuously in one direction, a reciprocating frame, ruling instrumentalities including a carrier pivotally mounted on the reciprocating frame, a ruling implement mounted on the carrier, a guiding element for said implement and an arm secured to the carrier to traverse a determined path around the guiding element to cause the ruling implement to assume a work position during a part of its reciprocating movement.

6. A machine of the class described comprising a carriage, means to move the carriage, a ruling implement mounted in cooperative relation to the carriage, and means to reciprocate said ruling implement transversely to the direction of travel of the carriage, said reciprocating means including a cam, a controlling lever, means to support the ruling implement, and means to adjust the relative positions of the controlling lever and a part of the ruling implement support to thereby regulate the length of the ruling stroke of the ruling implement.

7. A machine of the class described, comprising a carriage, means to continuously move the carriage, a ruling implement mounted in cooperative relation to the carriage, means to impart continuously reciprocating movement to the ruling implement, and gearing mechanism having a positive ratio interposed between the carriage-moving means and the reciprocating means to determine the value of the spacing between the lines inscribed by the ruling implement.

8. In a machine of the class described comprising a work-supporting carriage and a cooperating reciprocating frame, a ruling implement on the frame, means to control the engagement of the ruling implement with a work-subject, said means including an escapement, and a guide arm on the reciprocating frame to be moved in a circuitous path around the escapement, whereby the ruling implement may be brought into cooperative contact with the work-subject during a portion of its circle of movement by the reciprocating frame and lifted from contact with the work-subject during the remainder of the movement of the reciprocating frame.

WILMER SOUDER.